United States Patent
Oules (10) Patent No.: US 12,475,670 B1
(45) Date of Patent: Nov. 18, 2025

(54) SYSTEMS AND METHODS FOR GENERATING NIGHT SKY IMAGES

(71) Applicant: GoPro, Inc., San Mateo, CA (US)

(72) Inventor: Guillaume Oules, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 288 days.

(21) Appl. No.: 18/457,207

(22) Filed: Aug. 28, 2023

(51) Int. Cl.
*G06V 10/24* (2022.01)
*G06T 5/50* (2006.01)
*G06V 10/60* (2022.01)

(52) U.S. Cl.
CPC .............. *G06V 10/242* (2022.01); *G06T 5/50* (2013.01); *G06V 10/60* (2022.01); *G06T 2207/20221* (2013.01); *G06V 2201/07* (2022.01)

(58) Field of Classification Search
CPC .. G06V 10/242; G06V 10/60; G06V 2201/07; G06T 5/50; G06T 2207/20221
See application file for complete search history.

(56) References Cited

U.S. PATENT DOCUMENTS

| | | | |
|---|---|---|---|
| 8,805,008 B1* | 8/2014 | Gillis | G06F 18/23 382/103 |
| 8,837,782 B1* | 9/2014 | Rosenwinkel | G01C 21/02 382/106 |
| 12,249,055 B1* | 3/2025 | Pelletier | G06T 7/80 |
| 2002/0125375 A1* | 9/2002 | Wu | B64G 1/244 244/171 |
| 2020/0174094 A1* | 6/2020 | Tchilian | G01S 5/163 |
| 2020/0233055 A1* | 7/2020 | Xu | G01C 25/00 |
| 2022/0084217 A1* | 3/2022 | Cidonio | B64G 1/244 |
| 2022/0245833 A1* | 8/2022 | Curti | G06T 7/246 |
| 2023/0209169 A1* | 6/2023 | Wen | G06T 7/73 |
| 2023/0331403 A1* | 10/2023 | Schmidt | B64G 1/361 |
| 2024/0168193 A1* | 5/2024 | Giolito | G06T 7/20 |
| 2025/0022161 A1* | 1/2025 | Garrido | G06T 7/12 |
| 2025/0022168 A1* | 1/2025 | Garrido | G06T 7/74 |

* cited by examiner

*Primary Examiner* — Wesley J Tucker
(74) *Attorney, Agent, or Firm* — Esplin & Associates, PC (57) ABSTRACT

An image capture device may capture images of the night sky while fixed in place. Changes in positions of stars depicted within the images may be used to determine the center of rotation for the images. The images may be rotated about the center of rotation and combined to generate a night sky image with a higher signal-to-noise ratio.

20 Claims, 5 Drawing Sheets

SYSTEMS AND METHODS FOR GENERATING NIGHT SKY IMAGES

FIELD

This disclosure relates to generating night sky images based on a center of rotation for the night sky images.

BACKGROUND

Night sky images may require long exposures to bring out the details in the night sky. Targets in the night sky, such as stars, galaxies, and nebulas, may move due to the rotation of the Earth. Use of an image capture device that is fixed in place to capture night sky images may result in blurring of the targets due to long exposures. Use of equatorial mounts to move the image capture device during long exposures to follow the targets may be complicated and costly.

SUMMARY

This disclosure relates to generating night sky images. Image information and/or other information may be obtained. The image information may define multiple images captured through a lens of an image capture device. The multiple images may include a first image, a second image, and/or other images. The multiple images may include depiction of multiple stars. Two or more stars depicted within the first image and the second image may be identified. Positions of the two or more stars depicted within the first image and the second image may be identified. The positions of the two or more stars may change between the first image and the second image. A center of rotation for the multiple images may be determined based on the positions of two or more stars depicted within the first image and the second image, and/or other information. The second image may be rotated about the center of rotation for the multiple images to align the multiple stars depicted within the second image to the multiple stars depicted within the first image. The first image and the rotated second image may be combined to generate a combined image. The combined image may have a higher signal-to-noise ratio than the first image or the second image.

A system for generating night sky images may include one or more electronic storage, processor, and/or other components. The electronic storage may store image information, information relating to images, information relating to an image capture device, information relating to stars depicted within images, information relating to a center of rotation for images, information relating to combining images, information relating to combined images, and/or other information.

The processor(s) may be configured by machine-readable instructions. Executing the machine-readable instructions may cause the processor(s) to facilitate generating night sky images. The machine-readable instructions may include one or more computer program components. The computer program components may include one or more of an image component, a celestial object component, a position component, a center component, a rotate component, a combine component, and/or other computer program components. In some implementations, the processor(s) may be carried by an image capture device.

The image component may be configured to obtain image information and/or other information. The image information may define multiple images captured through one or more lenses of an image capture device. The multiple images may include a first image, a second image, and/or other images. The multiple images may include depiction of multiple stars.

The celestial object component may be configured to identify two or more stars depicted within the first image, the second image, and/or other images. In some implementations, identification of the two or more stars depicted within the first image, the second image, and/or other images may include identification of two or more brightest stars depicted within the first image, the second image, and/or other images.

In some implementations, identification of the two or more stars depicted within first image, the second image, and/or other images may include: identification of a fewer number of stars depicted within the first image, the second image, and/or other images based on a longer time interval between capture of the first image, the second image, and/or other images; and identification of a greater number of stars depicted within the first image, the second image, and/or other images based on a shorter time interval between capture of the first image, the second image, and/or other images.

The position component may be configured to identify positions of the two or more stars depicted within the first image, the second image, and/or other images. The positions of the two or more stars may change between the first image, the second image, and/or other images.

The center component may be configured to determine a center of rotation for the multiple images. The center of rotation for the multiple images may be determined based on the positions of two or more stars depicted within the first image, the second image, and/or other images.

In some implementations, determination of the center of rotation for the multiple images based on the positions of two or more stars depicted within the first image, the second image, and/or other images may include: determination of segments that join the positions of two or more stars depicted within the first image, the second image, and/or other images; and determination of the center of rotation for the multiple images based on an intersection of perpendicular bisectors of the segments that join the positions of two or more stars depicted within the first image, the second image, and/or other images.

In some implementations, the perpendicular bisectors of the segments may intersect on a point. The center of rotation for the multiple images may be determined to be located at the point. In some implementations, the intersection of the perpendicular bisectors of the segments may form a polygon. The center of rotation for the multiple images may be determined to be located at a center of the polygon.

The rotate component may be configured to rotate one or more of the multiple images about the center of rotation for the multiple images to align the multiple images. The second image and/or other images may be rotated about the center of rotation for the multiple images to align the multiple stars depicted within the second image and/or other images to the multiple stars depicted within the first image.

In some implementations, the second image and/or other images may be rotated about the center of rotation for the multiple images based on speed of Earth's angular rotation and/or other information.

In some implementations, the second image and/or other images may be projected to a linear space based on a lens model of the lens(es) of the image capture device. The second image and/or other images may be rotated about the center of rotation in the linear space. The second image and/or other images may be projected out of the linear space based on the lens model of the lens(es) of the image capture device and/or other information.

The combine component may be configured to combine multiple images to generate a combined image. The first image, the rotated second image, and/or other rotated images may be combined to generate a combined image. The combined image may have a higher signal-to-noise ratio than individual images that are combined. The combined image may have a higher signal-to-noise ratio than the first image, the second image, or other images.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
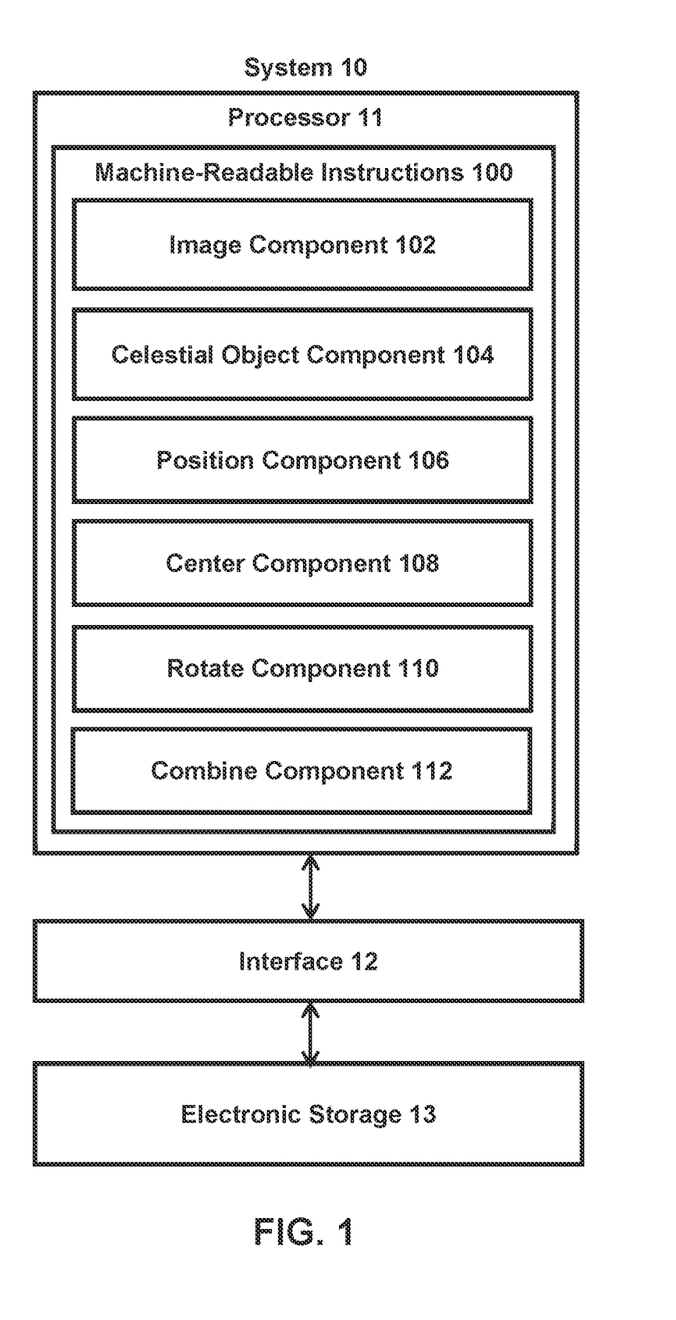
FIG. 1 illustrates an example system for generating night sky images.

FIG. 1 illustrates a system 10 for generating night sky images. The system 10 may include one or more of a processor 11, an interface 12 (e.g., bus, wireless interface), an electronic storage 13, and/or other components. Image information and/or other information may be obtained by the processor. The image information may define multiple images captured through a lens of an image capture device. The multiple images may include a first image, a second image, and/or other images. The multiple images may include depiction of multiple stars. Two or more stars depicted within the first image and the second image may be identified by the processor. Positions of the two or more stars depicted within the first image and the second image may be identified by the processor. The positions of the two or more stars may change between the first image and the second image. A center of rotation for the multiple images may be determined by the processor based on the positions of two or more stars depicted within the first image and the second image, and/or other information. The second image may be rotated about the center of rotation for the multiple images by the processor to align the multiple stars depicted within the second image to the multiple stars depicted within the first image. The first image and the rotated second image may be combined by the processor to generate a combined image. The combined image may have a higher signal-to-noise ratio than the first image or the second image.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store image information, information relating to images, information relating to an image capture device, information relating to stars depicted within images, information relating to a center of rotation for images, information relating to combining images, information relating to combined images, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, and/or the electronic storage 13 of the system 10 may be carried by the housing of the image capture device. The image capture device may carry other components, such as one or more optical elements and/or one or more image sensors. References to the housing of an image capture device may refer to the image capture device, and vice versa.

Figure 3:
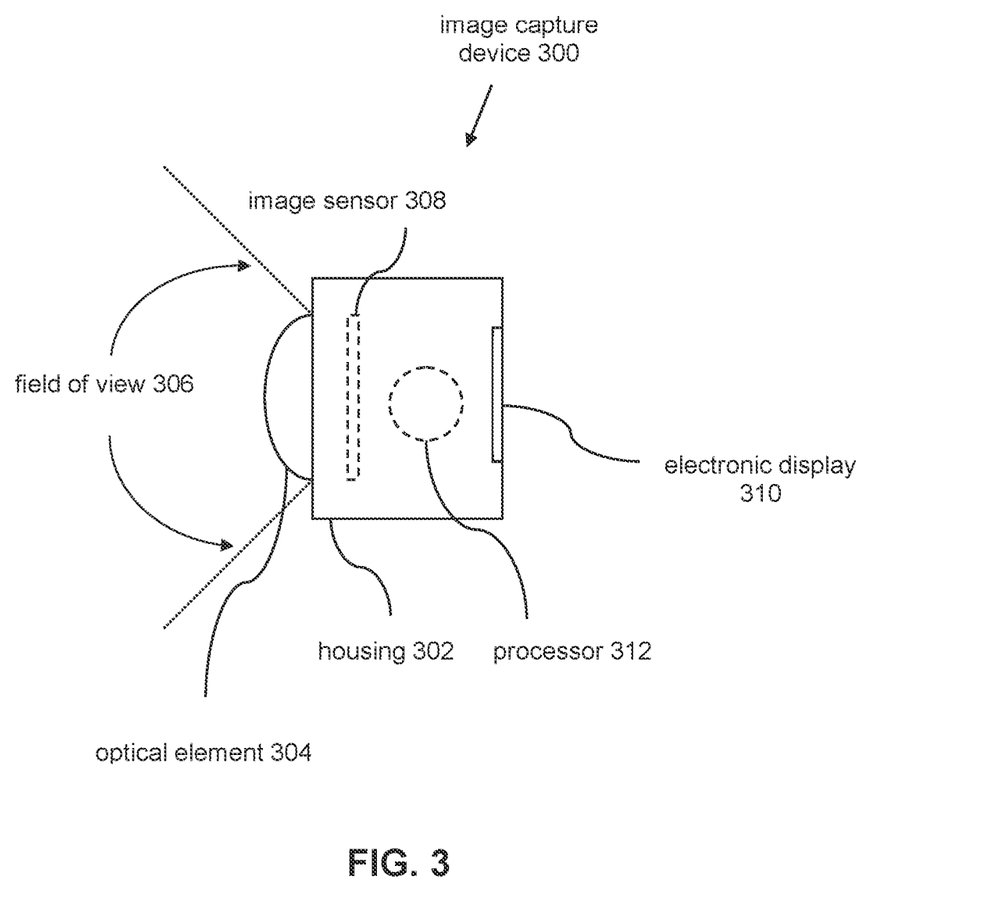
FIG. 3 illustrates an example image capture device.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 300. Visual content (e.g., of image(s), video frame(s)) may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry (be attached to, support, hold, and/or otherwise carry) one or more of an optical element 304, an image sensor 308, an electronic display 310, a processor 312, and/or other components.

One or more components of the image capture device 300 may be the same as, be similar to, and/or correspond to one or more components of the system 10. For example, the processor 312 may be the same as, be similar to, and/or correspond to the processor 11. The image capture device 300 may include other components not shown in FIG. 3. The image capture device 300 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 306. The optical element 304 may be configured to guide light within the field of view 306 to the image sensor 308.

The field of view 306 may include the field of view of a scene that is within the field of view of the optical element 304 and/or the field of view of the scene that is delivered to the image sensor 308. For example, the optical element 304 may guide light within its field of view to the image sensor 308 or may guide light within a portion of its field of view to the image sensor 308. The field of view of 306 of the optical element 304 may refer to the extent of the observable world that is seen through the optical element 304. The field of view may have a size. The size of field of view 306 of the optical element 304 may include one or more angles (e.g., vertical angle, horizontal angle, diagonal angle) at which light is received and passed on by the optical element 304 to the image sensor 308. In some implementations, the field of view 306 may be greater than 180-degrees. In some implementations, the field of view 306 may be equal to 180-degrees. In some implementations, the field of view 306 may be smaller than 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 308 may include sensor(s) that converts received light into output signals. The output signals may include electrical signals. The image sensor 308 may generate output signals conveying information that defines visual content of one or more images and/or one or more video frames of a video. For example, the image sensor 308 may include one or more of a charge-coupled device sensor, an active pixel sensor, a complementary metal-oxide semiconductor sensor, an N-type metal-oxide-semiconductor sensor, and/or other image sensors.

The image sensor 308 may be configured to generate output signals conveying information that defines visual content of one or more images and/or one or more video frames of a video. The image sensor 308 may be configured to generate a visual output signal and/or other output signals. The visual output signal may convey visual information based on light that becomes incident on the image sensor 308 and/or other information. The visual output signal may convey visual information that defines visual content having a field of view. The optical element 304 may be configured to guide light within the field of view 306 to the image sensor 308, and the image sensor 308 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

The visual information may be stored in information for images, video frames, and/or videos. For example, the visual information may be stored in image information for images. The image information may define images captured by the image capture device 300. The image information may define visual content of the images.

Capture of visual content by the image sensor 308 may include conversion of light received by the image sensor 308 into output signals/visual information defining visual content. Capturing visual content may include recording, storing, and/or otherwise capturing the visual content for use in generating video content (e.g., content of video frames). For example, during a capture duration, the visual output signal generated by the image sensor 308 and/or the visual information conveyed by the visual output signal may be used to record, store, and/or otherwise capture the visual content for use in capturing (generating) images.

The electronic display 310 may refer to an electronic device that provides visual presentation of information. The electronic display 310 may include a color display and/or a non-color display. In some implementations, the electronic display 310 may include one or more touchscreen displays. The electronic display 310 may be configured to present information. The electronic display 310 may be configured to visually present information. The electronic display may be configured to present one or more graphical user interfaces, visual content, and/or other information. The graphical user interface may enable a user to interact with the image capture device 300 and/or see information provided by the image capture device 300.

While the image capture device 300 is shown as having one electronic display, this is merely as an example and is not meant to be limiting. In some implementations, the image capture device may include multiple electronic displays. For example, the image capture device 300 may include a rear-facing electronic display (e.g., the electronic display 310) and a front-facing electronic display. Other arrangements of electronic displays are contemplated.

The processor 312 may include one or more processors (logic circuitry) that provide information processing capabilities in the image capture device 300. The processor 312 may provide one or more computing functions for the image capture device 300. The processor 312 may operate/send command signals to one or more components of the image capture device 300 to operate the image capture device 300. For example, the processor 312 may facilitate operation of the image capture device 300 in capturing image(s) and/or video(s), facilitate operation of the optical element 304 (e.g., change how light is guided by the optical element 304), facilitate operation of the image sensor 308 (e.g., change how the received light is converted into information that defines images/videos and/or how the images/videos are post-processed after capture), and/or facilitate operation of the electronic display 310.

The processor 312 may obtain information from the image sensor 308 and/or facilitate transfer of information from the image sensor 308 to another device/component. The processor 312 may be remote from the processor 11 or local to the processor 11. One or more portions of the processor 312 may be remote from the processor 11 and/or one or more portions of the processor 11 may be part of the processor 312. The processor 312 may include and/or perform one or more functionalities of the processor 11 shown in FIG. 1.

A night sky image may refer to an image that depicts the night sky. A night sky image may refer to an image that depicts the nighttime appearance of celestial objects, such as stars, galaxies, and nebulas. A night sky image may refer to an image that depicts celestial objects when the Sun is below the horizon. Taking night sky images may rely on long exposure to capture sufficient light from celestial objects. Due to the rotation of the Earth, the celestial objects may rotate during capture of night sky images. If the exposure time for night sky images are too long, the celestial objects may be blurred within the night sky images. For example, rather than appearing as a dot, a star may be depicted as a curve/star trail.

Traditional nighttime photography may utilize rotors (e.g., equatorial mounts) to compensate for rotation of the Earth. The rotors may rotate the image capture device to match the rotation of the Earth so that the celestial objects do not appear to move with respect to the image capture device. However, such equipment may be costly and/or difficult to set up.

The present disclosure enable night sky images to be captured/generated by a fixed image capture device. After images are captured an image capture device that is fixed in place/pointed in the same direction during capture, the compensatory rotation of the image capture device may be simulated by rotating the images using a center of rotation for the images. The center of rotation for the images may be determined by tracking two more stars across multiple images, and then finding the intersection of perpendicular bisectors of segments created by movement of stars across the multiple images. The rotated images are combined to generate the night sky image. In some implementations, the post-capture processing of the images (e.g., determining the center of rotation, rotating the images, combining the rotated images) may be performed by the image capture devices. In some implementations, the post-capture processing of the images may be performed by another computing device (e.g., mobile device, desktop device).

Referring back to FIG. 1, the processor 11 (or one or more components of the processor 11) may be configured to obtain information to facilitate generating night sky images. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a sound sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating night sky images. The machine-readable instructions 100 may include one or more computer program components. The machine-readable instructions 100 may include one or more of an image component 102, a celestial object component 104, a position component 106, a center component 108, a rotate component 110, a combine component 112, and/or other computer program components.

In some implementations, the processor 11 may be carried by the image capture device that captures the images for generation of night sky images. In some implementations, the processor 11 may be carried by a computing device separate from the image capture device that captures the images for generation of night sky images. In some implementations, some or all of the processes of the processor 11 may be performed by the image capture device that captures the images. In some implementations, some or all of the processes of the processor 11 may be performed by a computing device (e.g., mobile device, desktop device) separate from the image capture device that captures the images. In some implementations, some of the processes of the processor 11 may be performed by the image capture device and some of the processes of the processor 11 may be performed by a separate computing device.

The image component 102 may be configured to obtain image information and/or other information. Obtaining image information may include one or more of accessing, acquiring, analyzing, determining, examining, generating, identifying, loading, locating, opening, receiving, retrieving, reviewing, selecting, storing, and/or otherwise obtaining the image information. The image component 102 may obtain image information from one or more locations. For example, the image component 102 may obtain image information from a storage location, such as the electronic storage 13, electronic storage of information and/or signals generated by one or more sensors, electronic storage of a device accessible via a network, and/or other locations. The image component 102 may obtain image information from one or more hardware components (e.g., an image sensor) and/or one or more software components (e.g., software running on a computing device).

In some implementations, the image component 102 may obtain image information based on user interaction with a user interface/application (e.g., image editing application, image viewer application), and/or other information. For example, a user interface/application may provide option(s) for a user to generate a night sky image from multiple images. The image information defining images may be obtained based on the user's selection of the images through the user interface/application for use in generating a night sky image. Other selections of images for retrieval of image information are contemplated.

The image information may define multiple images captured through one or more optical elements (e.g., lens(es)) of an image capture device. The multiple images may include a first image, a second image, and/or other images. The multiple images may include visual content. The image information may define the visual content of multiple images. The visual content of the multiple images may have a field of view. The field of view of the multiple images may depend on the field of view of the optical element (e.g., lens(es) through which the multiple images are captured. The field of view of the visual content may refer to a portion of a scene that was observed by an image capture device in capturing the visual content/images. The field of view may refer to the extent (e.g., angle, size) of a scene that is captured within the visual content/images. A scene may refer to a place and/or a location in which the image capture device is located while capturing visual content. A scene may include one or more portions of a view at which the image capture device is directed during capture of the visual content. A scene may include one or more portions of a view that are within the field of view of the image capture device during capture of the visual content.

The image information may define an image by including information that defines one or more content, qualities, attributes, features, and/or other aspects of the image. For example, the image information may define an image by including information that makes up the content of the image and/or information that is used to determine the content of the image. For instance, the image information may include information that makes up and/or is used to determine the arrangement of pixels, characteristics of pixels, values of pixels, and/or other aspects of pixels that define visual content of the image. Other types of image information are contemplated.

The multiple images may include depiction of one or more celestial objects. A celestial object may refer to a physical entity, association, or structure that exists within the observable universe. A celestial object may refer to an object that is located outside the Earth's atmosphere. Examples of celestial objects include stars, galaxies, nebulas, and/or other celestial objects. For example, the images captured by the image capture device may include depiction of multiple stars and/or other celestial objects.

The multiple images may include images captured by the image capture device at different moments in time. The multiple images may include sequential images captured by the image capture device. The multiple image may include depiction of celestial objects at different position within the multiple images. With the image capture device fixed in place during image capture, the positions of the celestial objects within the images may change due to the rotation of the Earth. That is, due to the images being captured at different times and the rotation of the Earth, a celestial object that is located at one position within one image may be located at another position within another image.

The image information may be stored within a single file or multiple files. For example, image information defining an image may be stored within an image file, multiple image files, a combination of different files, and/or other files. Image information may be stored in one or more formats or one or more containers.

The celestial object component 104 may be configured to identify two or more celestial objects depicted within the multiple images. Identifying a celestial object within an image may include ascertaining, detecting, determining, establishing, finding, indicating, locating, obtaining, and/or otherwise identifying the celestial object within the image. The celestial object component 104 may be configured to identify two or more celestial objects within different images. For example, the celestial object component 104 may be configured to identify two or more stars depicted within the first image, the second image, and/or other images. While the description of the present disclosure is provided with stars, this is merely an example and is not meant to be limiting. Use of other celestial objects depicted within the images is contemplated.

The celestial objects depicted within the multiple images may be identified based on analysis of the images, the visual content of the images, and/or other information. Analysis of the images/the visual content of the images may include analysis of the content of the image, such as analysis of the arrangement of pixels, characteristics of pixels, values of pixels, and/or other aspects of pixels of the images. Analysis of images/the visual content of the images may include use of computer vision, object detection, object recognition, and/or techniques to identify celestial objects depicted within the multiple images. Other identification of celestial objects depicted within the multiple images is contemplated.

Figure 4A:
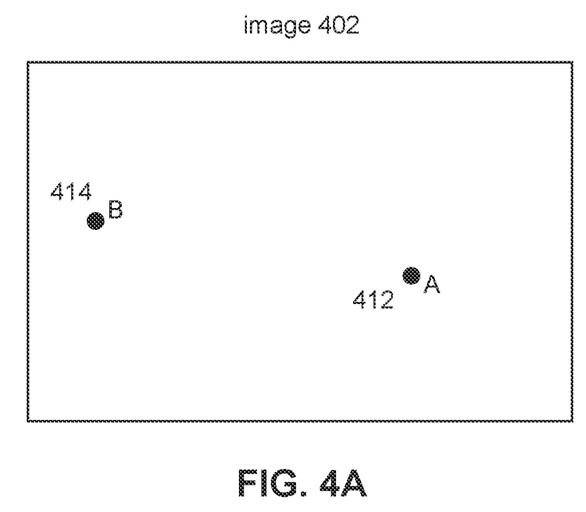
FIG. 4A illustrates an example image captured by an image capture device.
Figure 4B:
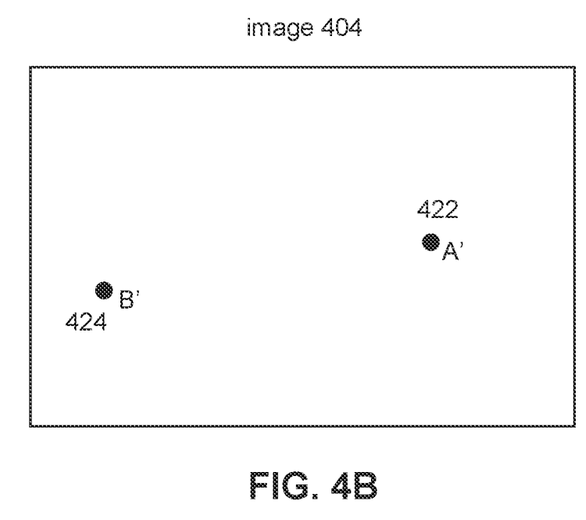
FIG. 4B illustrates an example image captured by an image capture device.

FIG. 4A and FIG. 4B illustrate example images 402, 404 captured by an image capture device. The images 402, 404 may be captured by the same image capture device. The images 402, 404 may be captured by the image capture device at different moments in time. The image capture device may be fixed in placed during capture of the images 402, 404. The image 402 may include depiction of star A 412 and star B 414. The image 404 may include depiction of star A' 422 and star B' 424. The exposure time for the images 402, 404 may be limited to reduce/eliminate blurring/trailing of the stars 412, 414, 422, 424 within the images 402, 404. The positions of the stars 412, 414, 422, 424 may change between the images 402, 404 due to the rotation of the Earth.

In some implementations, identification of the two or more celestial objects (e.g., stars) depicted within multiple images (e.g., the first image, the second image, and/or other images) may include identification of two or more brightest celestial objects depicted within the multiple images. The brightness of the celestial objects depicted within the multiple images may be determined and used to filter out dimmer celestial objects. The celestial objects depicted within the multiple images with at least/more than a threshold of brightness may be identified.

In some implementations, the number of celestial objects that are identified within the multiple images may be controlled based on the time interval between the capture of the images. Shorter time intervals between the capture of the images may result in smaller changes in the locations of the celestial objects within the images. Longer time intervals between the capture of the images may result in greater changes in the locations of the celestial objects within the images. The amount by which the locations of celestial objects changes within the image may impact determination of a center of rotation for the images. A greater amount of change in the locations of celestial objects may make it easier to determine the center of rotation or make the center of rotation determination more accurate. Smaller amount of change in the locations of celestial objects may make it harder to determine the center of rotation or make the center of rotation determination less accurate. The number of celestial objects that are identified may be tuned based on the time interval between the capture of the images to account for the expected change in the locations of celestial objects.

The number of celestial objects that are identified within the multiple images may be automatically changed based on the length of time between the capture of the images (e.g., length of time between when the exposure for the images were started/stopped). Longer duration of time (time interval) between capture of the images may cause a fewer number of celestial objects to be identified. Shorter duration of time (time interval) between capture of the images may cause a greater number of celestial objects to be identified.

For example, a fewer number of stars depicted within the first image, the second image, and/or other images may be identified based on a longer time interval between capture of the first image, the second image, and/or other images. A greater number of stars depicted within the first image, the second image, and/or other images may be identified based on a shorter time interval between capture of the first image, the second image, and/or other images.

In some implementations, the celestial objects may be identified based on their positions within the multiple images. The celestial objects may be identified based on the celestial objects having a threshold distance between them. The celestial objects may be identified at different parts of the multiple images. Rather than identifying celestial objects in close proximity to each other within the multiple images, the celestial objects that are far from each other within the multiple images may be identified (e.g., identify stars that are scattered within the images).

The position component 106 may be configured to identify positions of the two or more celestial objects depicted within the multiple images. Identifying the position of a celestial object within an image may include ascertaining, detecting, determining, establishing, finding, indicating, locating, obtaining, and/or otherwise identifying the position of the celestial object within the image. The position component 106 may be configured to identify the positions of the two or more celestial objects within different images. For example, the position component 106 may be configured to identify the positions of the two or more stars depicted within the first image, the second image, and/or other images.

The celestial objects depicted within the multiple images may be identified based on analysis of the images, the visual content of the images, and/or other information. The positions of the celestial objects depicted within the multiple images may change between the multiple images. For example, the positions of the two or more stars may change between the first image, the second image, and/or other images. Identifying the positions of celestial objects depicted within the multiple images may include tracking the positions of celestial objects depicted within the multiple images across the multiple images. Identifying the positions of celestial objects depicted within the multiple images may include matching celestial objects depicted within the multiple images.

For example, referring to FIG. 4A and FIG. 4B, the positions of the stars 412, 414 depicted within the image 402 and the positions of the stars 422, 424 depicted within the image 424 may be identified. The star A 412 may be tracked from its position in the image 402 to the position of the star A' 422 in the image 404. The star A 412 in the image 402 may be matched to the star A' 422 in the image 404. The star B 414 may be tracked from its position in the image 402 to the position of the star B' 424 in the image 404. The star B 414 in the image 402 may be matched to the star B' 424 in the image 404.

The center component 108 may be configured to determine a center of rotation for the multiple images. Determining a center of rotation for the multiple images may include ascertaining, computing, establishing, finding, and/or otherwise determining the center of rotation for the multiple images. Determining a center of rotation for the multiple images may include determining where the center of rotation is positioned within the multiple images. Determining a center of rotation for the multiple images may include determining where within the field of view of the images the center of rotation for the multiple images are located.

The center of rotation for the multiple mages may refer to a point about which the celestial objects depicted within the multiple images rotate across the multiple images. The center of rotation for the multiple images may refer to a point about which the celestial objects depicted within the multiple images move in a circular manner. The center of rotation for the multiple images may be determined based on the positions of two or more celestial objects depicted within the multiple images and/or other information. For example, the center of rotation for the multiple images may be determined based on the positions of two or more stars depicted within the first image, the second image, and/or other images. The difference between the positions of two or more celestial objects depicted within the multiple images may be used to determine the center of rotation for the multiple images. For example, the difference between the positions of two or more stars depicted within consecutively captured images (e.g., consecutive frames) may be used to determine the center of rotation for the multiple images. Such determination of the center of rotation for the multiple images and sue of the center of rotation to rotate the images may enable the images to be combined to generate the night sky image. Such determination of the center of rotation for the multiple images and sue of the center of rotation to rotate the images may enable night sky images to be generated without use of complicated/computationally expensive process, such as creating a mesh of the images and deforming the mesh so that the celestial objects depicted within the images are superimposed. The present disclosure provides a simple but effective method of aligning images captured by a fixed image capture device to generate night sky images.

In some implementations, determination of the center of rotation for the multiple images based on the positions of two or more celestial objects (e.g., stars) depicted within the multiple images (e.g., the first image, the second image, and/or other images) may include: (1) determination of segments that join the positions of two or more celestial objects depicted within the multiple images; and (2) determination of the center of rotation for the multiple images based on an intersection of perpendicular bisectors of the segments that join the positions of two or more celestial objects depicted within the multiple images. Segments that join the different positions of individual celestial objects across multiple images (different positions of individual celestial objects at different times) may be determined, and the intersection of perpendicular bisectors of these segments may be used to determine the center of rotation for the multiple images.

Figure 4C:
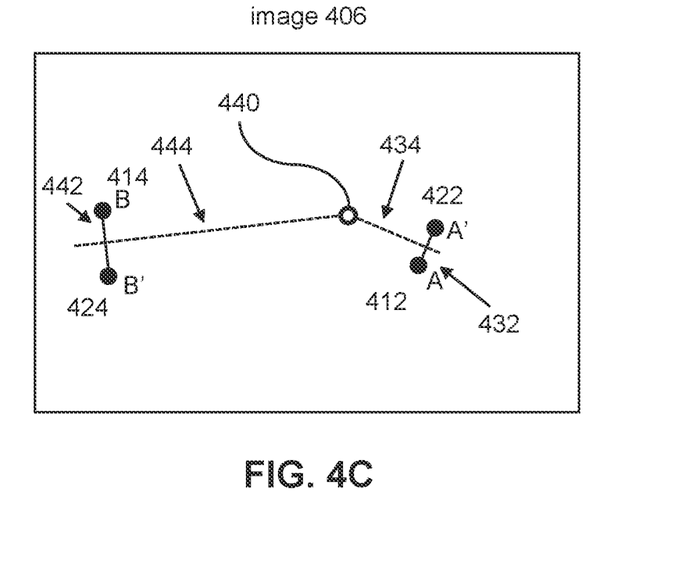
FIG. 4C illustrates an example identification of a center of rotation for multiple images.

For example, FIG. 4C shows an image 406 that includes the stars 412, 414, 422, 424 depicted within the images 402, 404. A segment 432 may be drawn between the star A 412 and the star A' 422. The segment 432 may join the positions of the same star A/A' depicted in the images 402, 404. A segment 442 may be drawn between the star B 414 and the star B' 424. The segment 442 may join the positions of the same star B/B'depicted in the images 402, 404.

A perpendicular bisector may refer to a line that bisects the segments at a right angle, through the midpoint of the segment. The perpendicular bisector may divide the segment through its midpoint. For example, referring to FIG. 4C, a perpendicular bisector 434 may be drawn for the segment 432, and a perpendicular bisector 444 may be drawn for the segment 442.

The intersection between the perpendicular bisectors may be used to determine the center of rotation for the multiple images. In some implementations, the perpendicular bisectors of the segments may intersect on a point, and the center of rotation for the multiple images may be determined to be located at the point. For example, referring to FIG. 4C, the perpendicular bisectors 434, 444 may intersect on a point 440, and the center of rotation for the multiple images may be determined to be located at the point 440. In some implementations, the intersection of the perpendicular bisectors of the segments may form a polygon, and the center of rotation for the multiple images may be determined to be located at a center of the polygon. For example, when using more than two celestial objects, the perpendicular bisectors may not converge on a point. Rather, the perpendicular bisectors may form a polygon, and the center of rotation for the multiple images may be determined to be at the center of the polygon formed by non-converging perpendicular bisectors.

The rotate component 110 may be configured to rotate one or more of the multiple images about the center of rotation for the multiple images to align the multiple images. The image(s) may be rotated about the center of rotation for the multiple images so that multiple images are aligned to each other. For example, one of the multiple images may be selected as a reference image. The reference image may not be rotated. Other images may be rotated about the center of rotation for the multiple images so that the rotated images are aligned to each other and to the reference images. As another example, all the images may be rotated to so that the celestial objects are aligned within the rotated images.

Alignment of the multiple images may include the celestial objects (e.g., stars) depicted within the images being aligned to each other. For example, the second image and/or other images may be rotated about the center of rotation for the multiple images to align the multiple stars depicted within the second image and/or other images to the multiple stars depicted within the first image. The stars depicted within the first image and the stars depicted within the rotated second image may be aligned to each other. The stars depicted within the first image and the stars depicted within the rotated second image may be located at the same positions within the images. The rotation of the image(s) may simulate the compensatory rotation of the image capture device during capture. The rotation of the image(s) may simulate images that would have been captured had the image capture device been rotated during capture to compensate for the rotation of the Earth.

Figure 4D:
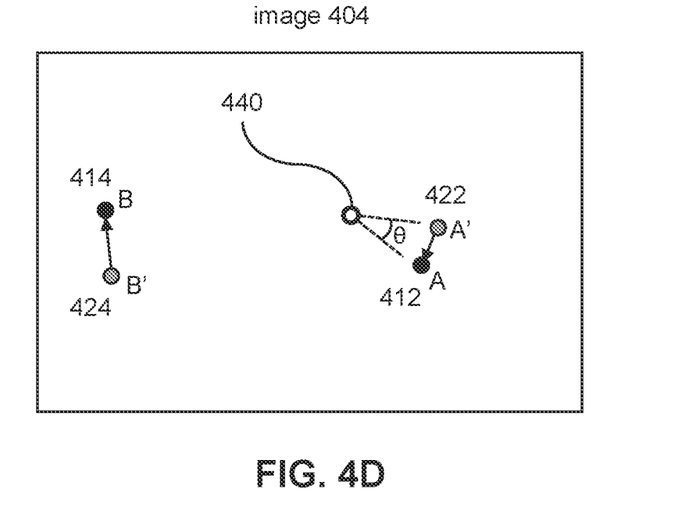
FIG. 4D illustrates an example rotation of an image.

FIG. 4D illustrates an example rotation of the image 404. The image 404 may be rotated about the center of rotation 440. The rotation of the image 404 about the center of rotation 440 may cause the position of the star A' 422 to change its position to the position of the star A 412. The rotation of the image 404 about the center of rotation 440 by angle θ may cause the position of the star B' 424 to change its position to the position of the star B 414.

In some implementations, one or more of the multiple images (e.g., the second image and/or other images) may be rotated about the center of rotation for the multiple images based on speed of Earth's angular rotation and/or other information. With the speed of Earth's angular rotation known (360 degrees every 23 hours 56 minutes 4 seconds; 7.292*10^-5 radians/sec), the image(s) may be rotated based the speed of Earth's angular rotation and the time interval between the capture of the reference image and the image being rotated/the time interval between the capture of all images being rotated. For example, consecutive images that are captured by the image capture device may be incrementally rotated so that the images are aligned to the first image that was captured.

In some implementations, the images that are to be rotated (e.g., the second image and/or other images) may be projected to a linear space based on a lens model of the optical element(s) (e.g., lens(es)) of the image capture device. The lens model may be used to transform the images from the image space to the linear space. The images may be rotated about the center of rotation in the linear space. The rotated images may be projected out of the linear space (back to the image space) based on the lens model of the optical element(s) of the image capture device and/or other information. Such projection may allow the rotation of images to account for lens distortions within the images. Without such projection, lens distortion within the images may cause errors in center of rotation determination, rotation of images, and/or combination of images. Such projection may be used to reduce/eliminate errors in center of rotation determination, rotation of images, and/or combination of images.

The combine component 112 may be configured to combine multiple images to generate a combined image. Combining the multiple images may include blending, merging, stacking, and/or otherwise combining the multiple images. The multiple images may be combined into the combined image. For example, the reference image may be combined with the rotated image(s) to generate the combined image. For instance, the first image, the rotated second image, and/or other rotated images may be combined to generate the combined image. As another example, all rotated images may be combined to generate the combined image. The combined image may be a night sky image. Combining the images may simulate light accumulation of a static sky.

The combined image may have a higher signal-to-noise ratio than individual images that are combined. The combined image may have a higher signal-to-noise ratio than the first image, the second image, or other images. Combined the images in which the depictions of celestial objects are aligned may reduce the noise within the combined image while increasing the details of the celestial objects within the combined image. The combined image having a higher signal-to-noise ratio than individual images that are combined may result in the combined image being cleaner/less noisy than the individual images. The combined image may show celestial objects with greater clarity and/or brightness than the individual images. The combined image may make visible celestial objects that were not visible within the individual images.

In some implementations, one or more segmentations may be performed to combine the images. For example, the images may include depiction of the sky and other objects (e.g., ground, structure, person). The depiction of the sky may be segmented from other depictions, and the depiction of the sky may be combined to generate the combined image. The combined depiction of the sky may be combined with other depictions to generate the combined image.

The combined image (combined image information defining the combined image) may be stored in the electronic storage 13 and/or other locations. The combined image may be presented on one or more electronic displays, such as an electronic display of the image capture device that captured the images and/or an electronic display of a mobile/desktop device.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
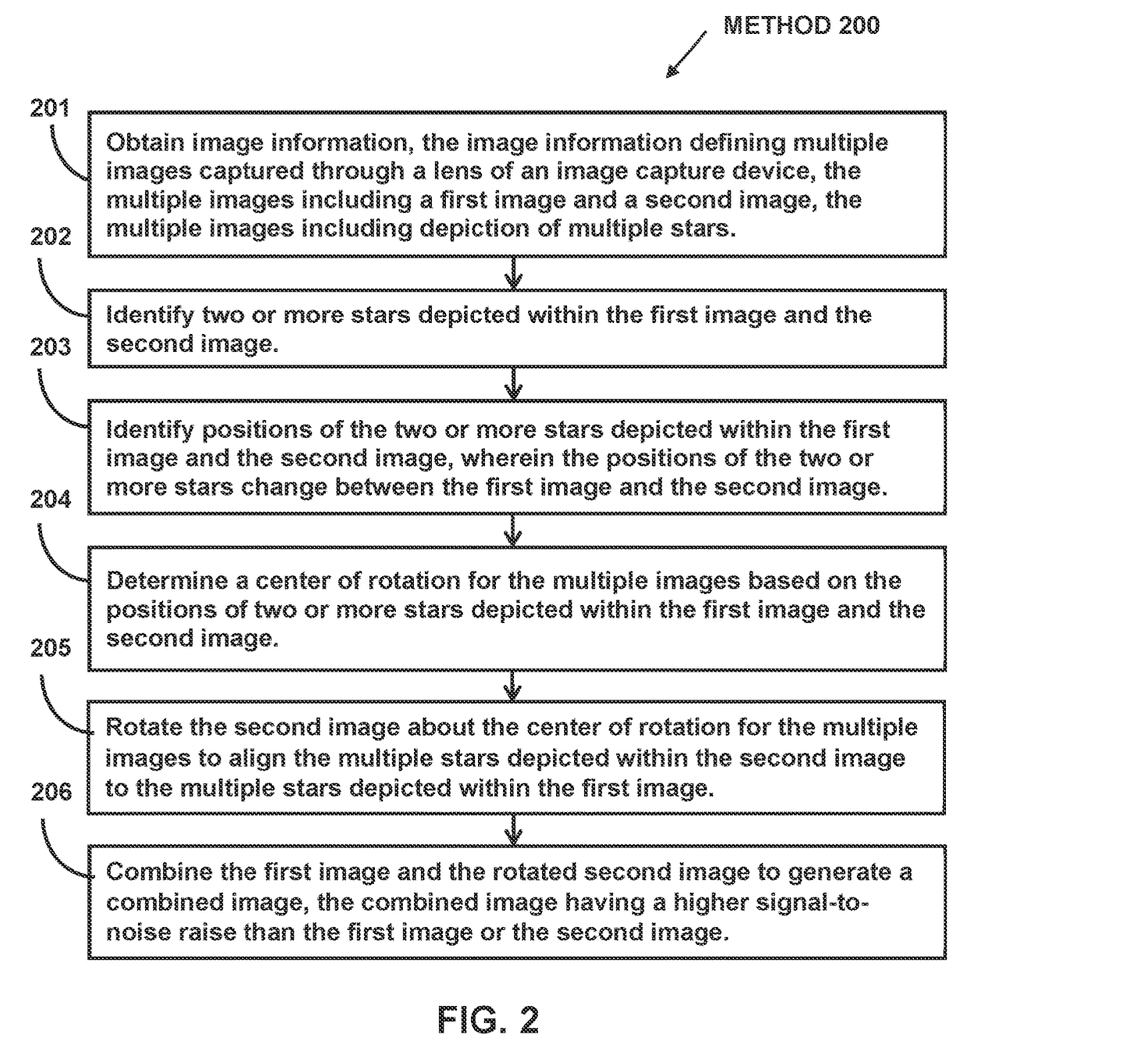
FIG. 2 illustrates an example method for generating night sky images.

FIG. 2 illustrates method 200 for generating night sky images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, Image information may be obtained. The image information may define multiple images captured through a lens of an image capture device. The multiple images may include a first image, a second image, and/or other images. The multiple images may include depiction of multiple stars. In some implementations, operation 201 may be performed by a processor component the same as or similar to the image component 102 (Shown in FIG. 1 and described herein).

At operation 202, two or more stars depicted within the first image and the second image may be identified. In some implementations, operation 202 may be performed by a processor component the same as or similar to the celestial object component 104 (Shown in FIG. 1 and described herein).

At operation 203, positions of the two or more stars depicted within the first image and the second image may be identified. The positions of the two or more stars may change between the first image and the second image. In some implementations, operation 203 may be performed by a processor component the same as or similar to the position component 106 (Shown in FIG. 1 and described herein).

At operation 204, a center of rotation for the multiple images may be determined based on the positions of two or more stars depicted within the first image and the second image, and/or other information. In some implementations, operation 204 may be performed by a processor component the same as or similar to the center component 108 (Shown in FIG. 1 and described herein).

At operation 205, the second image may be rotated about the center of rotation for the multiple images to align the multiple stars depicted within the second image to the multiple stars depicted within the first image. In some implementations, operation 205 may be performed by a processor component the same as or similar to the rotate component 110 (Shown in FIG. 1 and described herein).

At operation 205, the first image and the rotated second image may be combined to generate a combined image. The combined image may have a higher signal-to-noise ratio than the first image or the second image. In some implementations, operation 205 may be performed by a processor component the same as or similar to the combine component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating night sky images, the system comprising:
   one or more physical processors configured by machine-readable instructions to:
      obtain image information, the image information defining multiple images captured through a lens of an image capture device, the multiple images including a first image and a second image, the multiple images including depiction of multiple stars;
      identify two or more stars depicted within the first image and the second image;
      identify positions of the two or more stars depicted within the first image and the second image, wherein the positions of the two or more stars change between the first image and the second image;
      determine a center of rotation for the multiple images based on the positions of two or more stars depicted within the first image and the second image, wherein determination of the center of rotation for the multiple images based on the positions of two or more stars depicted within the first image and the second image includes determination of segments that join the positions of two or more stars depicted within the first image and the second image, and determination of the center of rotation for the multiple images based on an intersection of perpendicular bisectors of the segments that join the positions of two or more stars depicted within the first image and the second image;
      rotate the second image about the center of rotation for the multiple images based on speed of Earth's angular rotation to align the multiple stars depicted within the second image to the multiple stars depicted within the first image; and
      combine the first image and the rotated second image to generate a combined image, the combined image having a higher signal-to-noise ratio than the first image or the second image.

2. The system of claim 1, wherein:
   the one or more physical processors are carried by the image capture device;
   the perpendicular bisectors of the segments intersect on a point, and the center of rotation for the multiple images is determined to be located at the point; or
   the intersection of the perpendicular bisectors of the segments forms a polygon, and the center of rotation for the multiple images is determined to be located at a center of the polygon.

3. A system for generating night sky images, the system comprising:
one or more physical processors configured by machine-readable instructions to:
obtain image information, the image information defining multiple images captured through a lens of an image capture device, the multiple images including a first image and a second image, the multiple images including depiction of multiple stars;
identify two or more stars depicted within the first image and the second image;
identify positions of the two or more stars depicted within the first image and the second image, wherein the positions of the two or more stars change between the first image and the second image;
determine a center of rotation for the multiple images based on the positions of two or more stars depicted within the first image and the second image;
rotate the second image about the center of rotation for the multiple images to align the multiple stars depicted within the second image to the multiple stars depicted within the first image; and
combine the first image and the rotated second image to generate a combined image, the combined image having a higher signal-to-noise ratio than the first image or the second image.

4. The system of claim 3, wherein identification of the two or more stars depicted within the first image and the second image includes identification of two brightest stars depicted within the first image and the second image.

5. The system of claim 3, wherein identification of the two or more stars depicted within first image and the second image includes:
identification of a fewer number of stars depicted within the first image and the second image based on a longer time interval between capture of the first image and the second image; and
identification of a greater number of stars depicted within the first image and the second image based on a shorter time interval between capture of the first image and the second image.

6. The system of claim 3, wherein determination of the center of rotation for the multiple images based on the positions of two or more stars depicted within the first image and the second image includes:
determination of segments that join the positions of two or more stars depicted within the first image and the second image; and
determination of the center of rotation for the multiple images based on an intersection of perpendicular bisectors of the segments that join the positions of two or more stars depicted within the first image and the second image.

7. The system of claim 6, wherein:
the perpendicular bisectors of the segments intersect on a point; and
the center of rotation for the multiple images is determined to be located at the point.

8. The system of claim 6, wherein:
the intersection of the perpendicular bisectors of the segments forms a polygon; and
the center of rotation for the multiple images is determined to be located at a center of the polygon.

9. The system of claim 3, wherein the second image is rotated about the center of rotation for the multiple images based on speed of Earth's angular rotation.

10. The system of claim 3, wherein:
the second image is projected to a linear space based on a lens model of the lens;
the second image is rotated about the center of rotation in the linear space; and
the second image is projected out of the linear space based on the lens model of the lens.

11. The system of claim 3, wherein the one or more physical processors are carried by the image capture device.

12. A method for generating night sky images, the method performed by a computing system including one or more processors, the method comprising:
obtaining, by the computing system, image information, the image information defining multiple images captured through a lens of an image capture device, the multiple images including a first image and a second image, the multiple images including depiction of multiple stars;
identifying, by the computing system, two or more stars depicted within the first image and the second image;
identifying, by the computing system, positions of the two or more stars depicted within the first image and the second image, wherein the positions of the two or more stars change between the first image and the second image;
determining, by the computing system, a center of rotation for the multiple images based on the positions of two or more stars depicted within the first image and the second image;
rotating, by the computing system, the second image about the center of rotation for the multiple images to align the multiple stars depicted within the second image to the multiple stars depicted within the first image; and
combining, by the computing system, the first image and the rotated second image to generate a combined image, the combined image having a higher signal-to-noise ratio than the first image or the second image.

13. The method of claim 12, wherein identifying the two or more stars depicted within the first image and the second image includes identifying two brightest stars depicted within the first image and the second image.

14. The method of claim 12, wherein identifying the two or more stars depicted within first image and the second image includes:
identifying a fewer number of stars depicted within the first image and the second image based on a longer time interval between capture of the first image and the second image; and
identifying a greater number of stars depicted within the first image and the second image based on a shorter time interval between capture of the first image and the second image.

15. The method of claim 12, wherein determining the center of rotation for the multiple images based on the positions of two or more stars depicted within the first image and the second image includes:
determining segments that join the positions of two or more stars depicted within the first image and the second image; and
determining the center of rotation for the multiple images based on an intersection of perpendicular bisectors of the segments that join the positions of two or more stars depicted within the first image and the second image.

16. The method of claim 15, wherein:
the perpendicular bisectors of the segments intersect on a point; and the center of rotation for the multiple images is determined to be located at the point.

17. The method of claim 15, wherein:

the intersection of the perpendicular bisectors of the segments forms a polygon; and the center of rotation for the multiple images is determined to be located at a center of the polygon.

18. The method of claim 12, wherein the second image is rotated about the center of rotation for the multiple images based on speed of Earth's angular rotation.

19. The method of claim 12, wherein:

the second image is projected to a linear space based on a lens model of the lens;

the second image is rotated about the center of rotation in the linear space; and the second image is projected out of the linear space based on the lens model of the lens.

20. The method of claim 12, wherein the one or more processors are carried by the image capture device.

* * * * *